United States Patent
Mochizuki et al.

(10) Patent No.: US 11,906,687 B2
(45) Date of Patent: Feb. 20, 2024

(54) UNDERGROUND SURVEY APPARATUS

(71) Applicant: Nippon Telegraph and Telephone Corporation, Tokyo (JP)

(72) Inventors: Shoji Mochizuki, Musashino (JP); Masayuki Tsuda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 186 days.

(21) Appl. No.: 17/637,747

(22) PCT Filed: Aug. 30, 2019

(86) PCT No.: PCT/JP2019/034064
§ 371 (c)(1),
(2) Date: Feb. 23, 2022

(87) PCT Pub. No.: WO2021/038816
PCT Pub. Date: Mar. 4, 2021

(65) Prior Publication Data
US 2022/0283333 A1 Sep. 8, 2022

(51) Int. Cl.
*G01V 3/17* (2006.01)
(52) U.S. Cl.
CPC .................. *G01V 3/17* (2013.01)
(58) Field of Classification Search
CPC ........................................ G01V 3/17
See application file for complete search history.

(56) References Cited

U.S. PATENT DOCUMENTS 3,967,282 A * 6/1976 Young .................. G01V 3/12
342/22
6,462,696 B1 * 10/2002 Gorman ............. G01S 13/0209
342/21
(Continued)

FOREIGN PATENT DOCUMENTS

CN 107390276 A * 11/2017 ........... G01S 13/885

OTHER PUBLICATIONS

Translation of CN-107390276-A (Year: 2017).*
(Continued)

*Primary Examiner* — Paresh Patel
(74) *Attorney, Agent, or Firm* — Workman Nydegger

(57) ABSTRACT

An underground investigation device includes a transmission unit configured to transmit a pulse wave, a reception unit configured to receive a reflected signal, a memory configured to store time waveform data of the reflected signal, a storage device having a larger capacity than a capacity of the memory, a control unit configured to transfer the time waveform data from the memory to the storage device, and a signal processing unit configured to generate underground investigation data based on the time waveform data in the storage device. The reception unit sets a measurement span for sampling the reflected signal by using, as a trigger, transmission of the pulse wave or reception of a reflected signal resulting from reflection by a ground surface, samples the reflected signal in the measurement span, and stores the time waveform data in the memory. The control unit transfers the time waveform data from the memory to the storage device after the measurement span.

15 Claims, 14 Drawing Sheets

(56) References Cited

U.S. PATENT DOCUMENTS 10,488,544 B2 * 11/2019 Yang .......................... G01V 3/38
11,428,801 B2 *  8/2022 Jeon ...................... A47L 7/0085

OTHER PUBLICATIONS

E. Moreno-Garcia et al., *An Approach to the Equivalent-Time Sampling Technique for Pulse Transient Measurements*, Proceedings of the 16th IEEE International Conference on Electronics, Communications and Computers (CONIELECOMP2006), Feb. 27, 2006, pp. 1-6.

Ming Yan et al., *Impulse Ground Penetrating Radar Hardware System Design*, 2006 6th International Conference on ITS Telecommunications Proceedings, Jun. 21, 2006, pp. 1244-1247.

Peter J. Pupalaikis et al., *Technologies for Very High Bandwidth Real-Time Oscilloscopes*, 2014 IEEE BCTM, Sep. 28, 2014, pp. 128-135.

\* cited by examiner

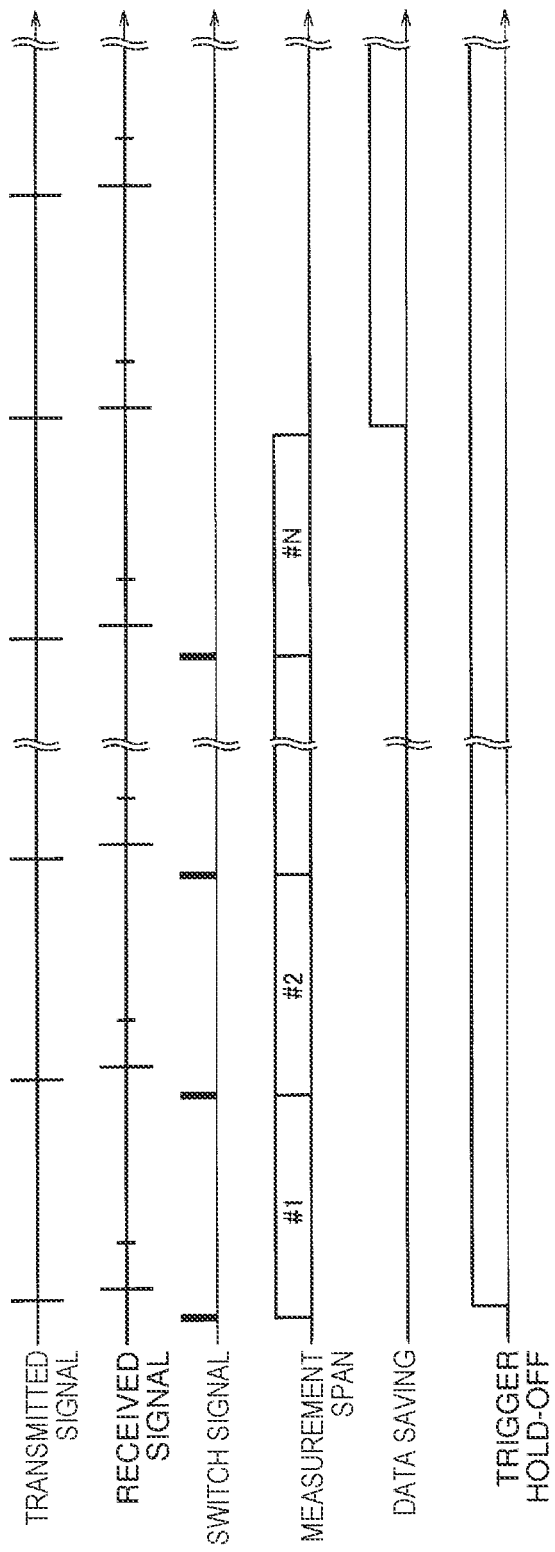

UNDERGROUND SURVEY APPARATUS

TECHNICAL FIELD

The present invention relates to an underground investigation device.

BACKGROUND ART

An underground investigation device transmits a transmitted signal in repetition cycles at regular intervals, receives a signal reflected or scattered by a scatterer on a ground surface and in an underground area, and thereby investigates a buried object in the underground area. Many underground investigation devices use an equivalent time sampling procedure for a reception circuit. The equivalent time sampling procedure is a procedure in which in a circumstance where the same signal waveform can consistently be received in the same cycles, only one point of the signal waveform is sampled in one cycle, a timing of sampling is shifted by a time of $\Delta t$ at each cycle, and the whole signal waveform is thereby acquired. For example, when a signal waveform whose cycle T is 100 ns is sampled with $\Delta t=1$ ns, in order to obtain the whole signal waveform, $T/\Delta t=100$ ns/1 ns=100 sampling points are necessary. In other words, in order to obtain the whole signal waveform, a time of 100 ns×100 times=10,000 ns (10 μs) is needed.

CITATION LIST

Non-Patent Literature

Non-Patent Literature 1: An Approach to the Equivalent Time Sampling Technique for Pulse Transient Measurements, Proc. of IEEE international conf. on ECC.
Non-Patent Literature 2: Impulse Ground Penetrating Radar Hardware System Design, Proc. of IEEE international conf. on ITS telecomm.
Non-Patent Literature 3: Technologies for very high bandwidth real time oscilloscopes, 2014 IEEE BCTM

SUMMARY OF THE INVENTION

Technical Problem

In an underground investigation, observation is repeated by observing a reflected signal at a certain spot, thereafter moving to a next observation spot, and observing a reflected signal at the next spot. A measurement time needed for an underground investigation is determined by an observation time needed for one spot and a movement time to a next spot. There has been a problem that an underground investigation device using the equivalent time sampling procedure needs time for observation of reflected signals and thus has difficulty in shortening a measurement time.

In order to shorten the measurement time of an underground investigation, it is possible to use a real-time sampling procedure employed for an oscilloscope with a built-in DSP. The real-time sampling procedure is a procedure in which a signal waveform is successively sampled at regular sampling intervals. In the real-time sampling procedure, a signal waveform as an observation target does not have to be periodic, and the signal waveform can be obtained by one set of successive samplings. The real-time sampling procedure is suitable for monitoring a signal waveform changing over time.

In the real-time sampling procedure, a data acquisition speed is fast, and a data acquisition capacity is large. Further, because sampling is performed at a very high speed, a memory is necessary which is capable of high speed access. An underground investigation device observes reflected signals while moving and thus needs observations at many spots. There has been a problem that because it is difficult for an underground investigation device to include a high-speed memory having a large capacity, when the real-time sampling procedure is used for an underground investigation device, a memory capacity is running short, and only measurement in a very short time is possible.

The present invention has been made in consideration of the above circumstance, and an object thereof is to provide an underground investigation device that performs real-time sampling of a reflected signal at an appropriate timing.

Means for Solving the Problem

An underground investigation device of one aspect of the present invention is an underground investigation device that investigates an underground area while moving, the underground investigation device including: a transmission unit configured to transmit a pulse wave in a predetermined repetition cycle; a reception unit configured to receive a reflected signal of the pulse wave; a memory configured to store time waveform data of the reflected signal; storage means having a larger capacity than a capacity of the memory; a control unit configured to transfer the time waveform data from the memory to the storage means; and a signal processing unit configured to generate underground investigation data based on the time waveform data stored in the storage means, in which the reception unit sets a measurement span for sampling the reflected signal by using, as a trigger, transmission of the pulse wave or reception of a reflected signal resulting from reflection of the pulse wave by a ground surface, samples the reflected signal in the measurement span, and stores time waveform data in the memory, the control unit transfers the time waveform data from the memory to the storage means after the measurement span, and the reception unit provides a trigger hold-off period in which the new measurement span is not set at least until transfer of the time waveform data is completed.

Effects of the Invention

The present invention can provide an underground investigation device that performs real-time sampling of a reflected signal at an appropriate timing.

BRIEF DESCRIPTION OF DRAWINGS

FIG. 15 is a timing chart in measurement of reflected signals by a third underground investigation device.

DESCRIPTION OF EMBODIMENTS

First Embodiment

Figure 1:
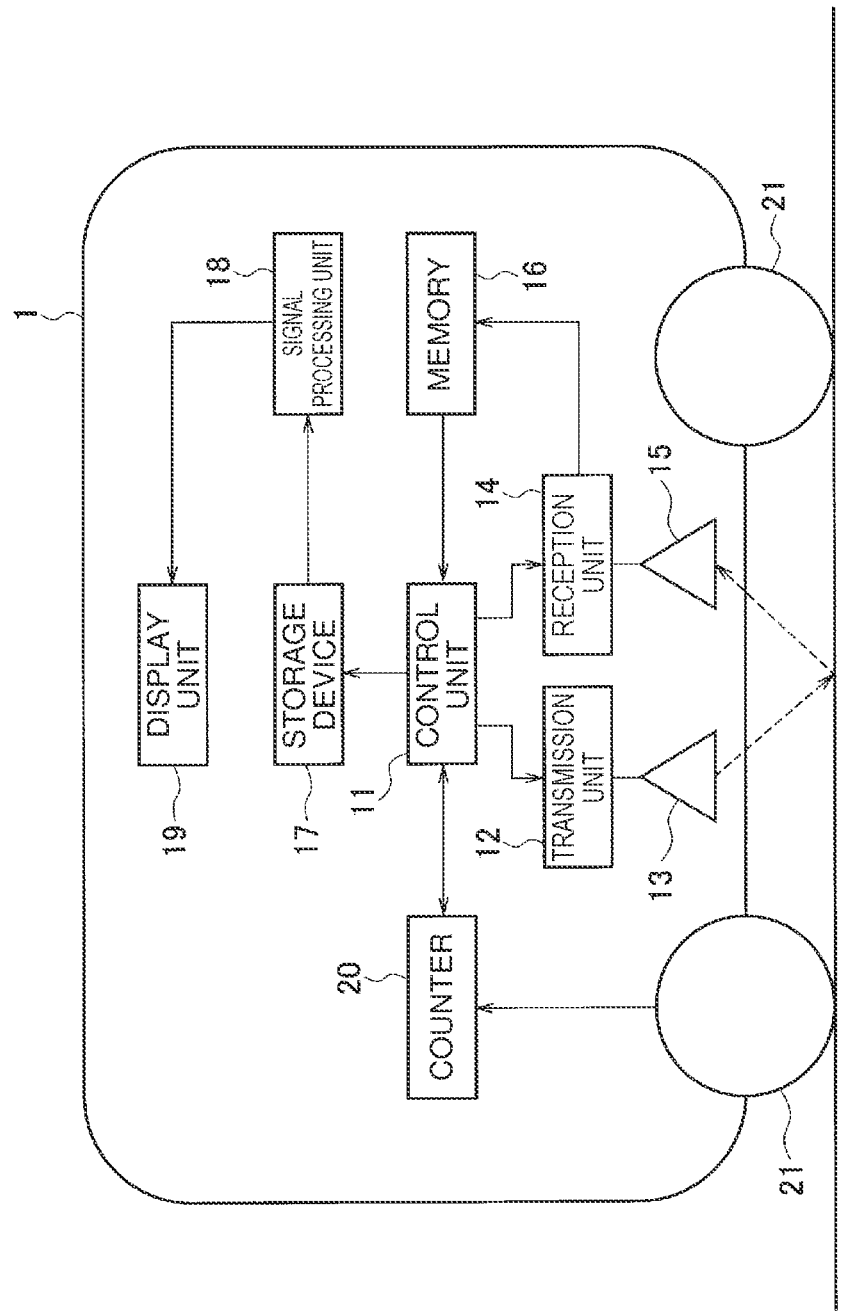
FIG. 1 is a function block diagram illustrating a configuration of an underground investigation device of a first embodiment.

A configuration of an underground investigation device of a first embodiment will be described with reference to FIG. 1. An underground investigation device 1 is a device that radiates a pulse wave (pulse-like electric wave) to an underground area, receives a reflected wave, analyzes the reflected wave, and thereby investigates a buried object in the underground area. The underground investigation device 1 illustrated in FIG. 1 includes a control unit 11, a transmission unit 12, a transmission antenna 13, a reception unit 14, a reception antenna 15, a memory 16, a storage device 17, a signal processing unit 18, a display unit 19, a counter 20, and wheels 21.

The control unit 11 transmits signs of a measurement start and a measurement end to the transmission unit 12, the reception unit 14, and the counter 20. The control unit 11 measures an elapsed time from a measurement start point. The control unit 11 monitors a change in a value of the counter 20 (counter value) and saves the counter value and the elapsed time at the point when the value changes in the storage device 17. A movement distance can be calculated from an increase amount of the counter value and a diameter of the wheel 21. After sampling by the reception unit 14 is completed, the control unit 11 transfers time waveform data sampled by the reception unit 14 from the memory 16 to the storage device 17. When the time waveform data are transferred to the storage device 17, time point information (for example, a measurement time point) in measurement is added.

The transmission unit 12 generates a pulse wave in a regular repetition cycle T and radiates the pulse wave from the transmission antenna 13 to a ground surface. The transmission unit 12 starts an operation at the sign of the measurement start and stops the operation at the sign of the measurement end. The transmission unit 12 continues to repeatedly transmit the pulse wave in the cycle T during the operation. The repetition cycle T may be variable.

The reception unit 14 digitizes a reflected signal received by the reception antenna 15 by a real-time sampling procedure and stores that in the memory 16. A reflected signal is a portion of a signal resulting from reflection and scattering of the pulse wave radiated from the transmission antenna 13 by the ground surface and a scatterer in an underground area. The reflected signal reflected by the ground surface is a signal to be first observed after the transmission unit 12 radiates the pulse wave, and the reflected signal which is subsequently received becomes an observation target. The reflected signal from the ground surface is the largest among signals to be received and can thus easily be selected.

The reception unit 14 sets a measurement span by using the reflected signal from the ground surface as a trigger and samples the reflected signal in the measurement span. For example, the reception unit 14 sets, as the measurement span, a predetermined time after the time point when the reflected signal from the ground surface is received. The reception unit 14 may start the measurement span from a time point slightly before the time point when the reflected signal from the ground surface is received. The reception unit 14 may set the measurement span by using transmission of the pulse wave as a trigger. The length of the measurement span can be determined by a sampling speed (sampling interval) and a record length (the number of samplings). The reception unit 14 sets, as the measurement span, a period in which the reflected signal useful for an underground investigation can be received. Although the span in which the reflected signal can be observed fluctuates in accordance with the output and frequency of an electric wave, in an underground investigation, the span is often about several tens of nanoseconds. The repetition cycle T of the pulse wave is set longer than the measurement span. Note that the measurement span may be set to a length including a plurality of repetition cycles T (for example, a length K times the cycle T). A high sensitivity mode in which the measurement span is set to the length K times the cycle T will be described later.

During sampling, the reception unit 14 stores the time waveform data of a sampled reflected signal in the memory 16. After completion of sampling, in other words, after the measurement span, the time waveform data are transferred from the memory 16 to the storage device 17. The reception unit 14 inhibits sampling of a new reflected signal, in other words, setting of a new measurement span so that the time waveform data in the memory 16 are not overwritten during transfer of the time waveform data.

In the present embodiment, the reception unit 14 includes a trigger hold-off function and stops production of a trigger based on the reflected signal from the ground surface in a trigger hold-off period. The trigger hold-off function is a function for inhibiting setting of a new measurement span and thereby inhibiting data generation due to sampling. For example, the reception unit 14 starts the trigger hold-off period before the transmission unit 12 transmits the next pulse wave. The reception unit 14 can arbitrarily set the trigger hold-off period in accordance with the interval in which the reflected signal is desired to be observed but sets at least a period to completion of transfer of the time waveform data to the storage device 17 as the trigger hold-off period. A transfer time of the time waveform data can be obtained from a data capacity to be transferred and a transfer speed. Although the reception antenna 15 also receives the reflected signal during the trigger hold-off period, because no trigger is produced, the reception unit 14 does not start new sampling.

As another method, a method is possible in which the repetition cycle T is made variable and set in accordance with a transfer time of the time waveform data. Specifically, the repetition cycle T is set longer than a time needed for sending of the pulse wave to completion of transfer of the time waveform data so that a new reflected signal from the ground surface is not produced until completion of transfer of the time waveform data.

The memory 16 temporarily stores the time waveform data of the reflected signal received by the reception unit 14. As the memory 16, a memory is used which has a capacity sufficient for storing the time waveform data to be sampled in the measurement span and operates at such a speed that the reception unit 14 can write the time waveform data in real time. The memory 16 is a storage device that has a smaller capacity than that of the storage device 17 but is capable of higher speed access than that of the storage device 17.

The storage device 17 manages the time waveform data on the basis of time. Specifically, the storage device 17 stores the time waveform data and the measurement time point (for example, a start time point of the measurement span). Further, the storage device 17 stores information in which the counter value and the time point are associated together.

A storage having a large capacity is used for the storage device 17. The storage device 17 may have a slower writing speed than that of the memory 16 as long as it has a larger capacity than that of the memory 16. A large capacity storage such as a hard disk drive, for example, can be used for the storage device 17.

The signal processing unit 18 refers to the counter value and the elapsed time which are saved in the storage device 17, calculates the movement distance from the measurement start point from the increase amount of the counter value and the diameter of the wheel 21, and associates the movement distance with the elapsed time. The signal processing unit 18 refers to the measurement time point linked to the time waveform data and generates underground investigation data while associating the time waveform data with the movement distance. For example, the underground investigation data are sets of time waveform data that are aligned while being associated with positions through which the underground investigation device 1 moves.

The display unit 19 displays the underground investigation data generated by the signal processing unit 18. For example, the display unit 19 places the movement distance in a lateral direction, displays, in a vertical direction, sets of time waveform data while associating those with positions in which the sets of time waveform data are observed, and can thereby indicate a state of a cross section of the underground area. The vertical direction is set as a depth direction.

The counter 20 is initialized by the sign of the measurement start and measures a rotation amount of the wheel 21. For example, the movement distance can be obtained by the multiplication of the counter value indicating the number of rotations of the wheel 21 by the length of a circumference of the wheel 21. It is sufficient that the counter 20 can obtain the movement distance of the underground investigation device 1.

The wheel 21 is movement means for moving the underground investigation device 1. The wheels 21 may be rotated by a motor or the like or may be rotated by pushing or pulling the underground investigation device 1 by a person.

Next, operation of the underground investigation device 1 of the present embodiment will be described with reference to a flowchart of FIG. 2 and a timing chart of FIG. 3.

Figure 2:
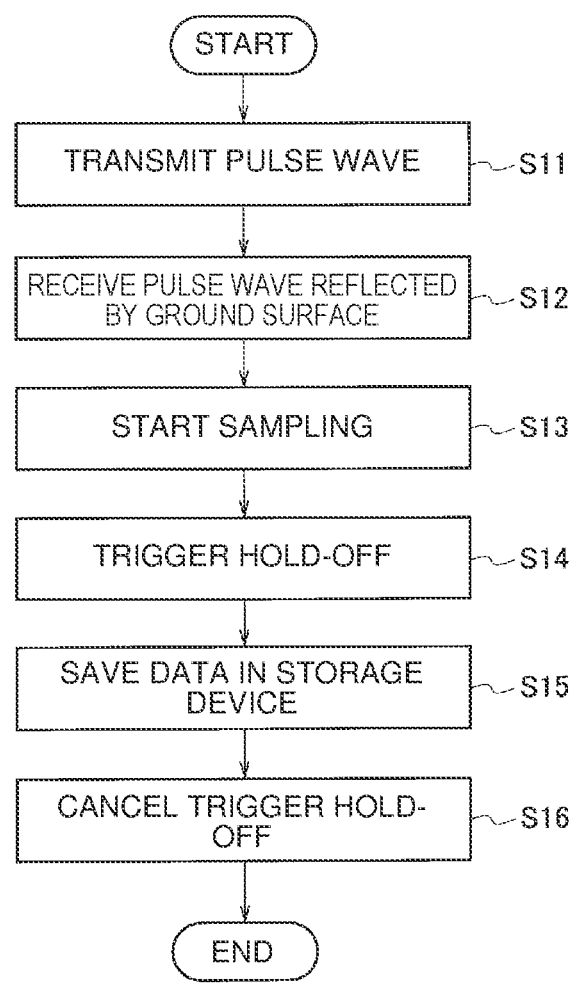
FIG. 2 is a flowchart illustrating a flow of a process of a first underground investigation device.
Figure 3:
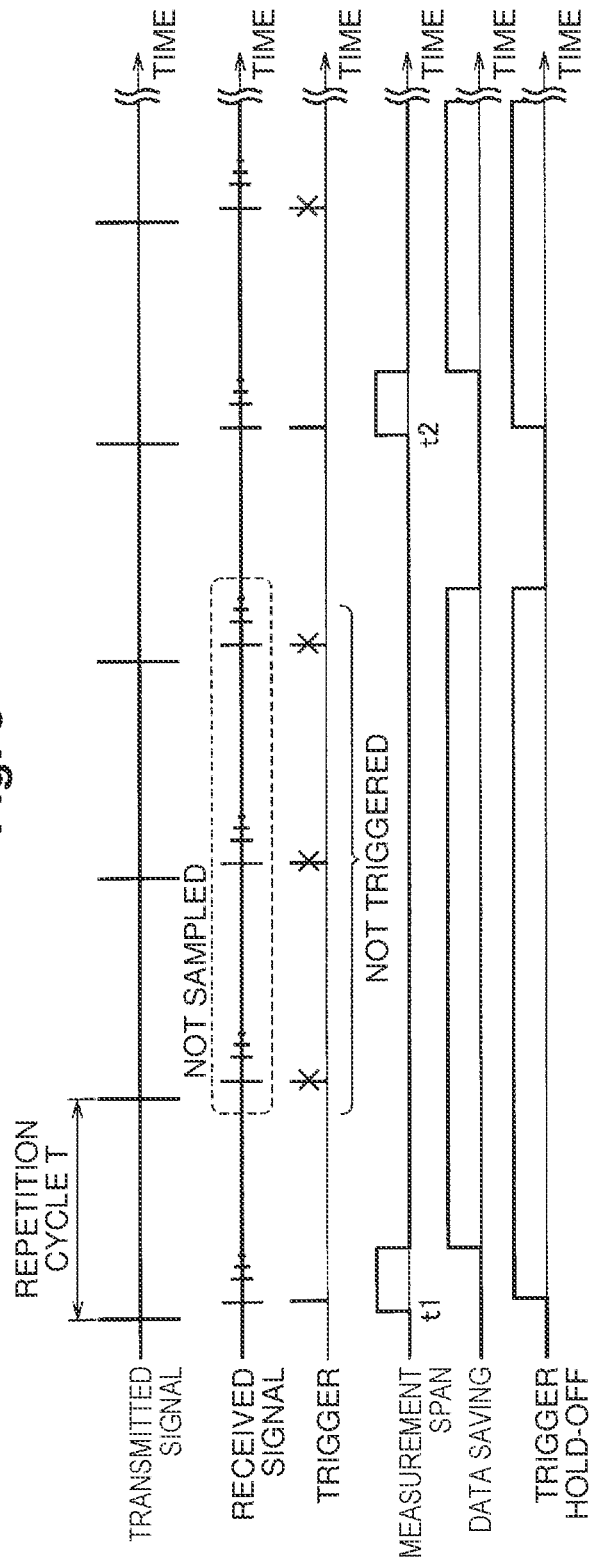
FIG. 3 is a timing chart in measurement of reflected signals by the first underground investigation device.

When the control unit 11 transmits the sign of the measurement start to the transmission unit 12 and the reception unit 14, the underground investigation device 1 starts a process of FIG. 2.

In step S11, the transmission unit 12 transmits the pulse wave from the transmission antenna 13 to the ground. As illustrated in FIG. 3, the transmission unit 12 transmits the pulse wave (transmitted signal) in the repetition cycle T.

In step S12, the reception unit 14 receives the reflected signal from the ground surface. The reception unit 14 uses reception of the reflected signal from the ground surface as a trigger of a start of sampling.

In step S13, the reception unit 14 starts sampling of the reflected signal. As illustrated in FIG. 3, the reception unit 14 sets the measurement span by using, as the trigger, reception of the reflected signal (received signal) from the ground surface and samples the reflected signal in the measurement span. In the example of FIG. 3, the measurement span is started at time point t1.

In step S14, the reception unit 14 starts the trigger hold-off period. As illustrated in FIG. 3, in the trigger hold-off period, because the reception unit 14 does not start measurement even when the reflected signal is received from the ground surface, the reflected signal is not sampled.

When the measurement span finishes, in other words, when sampling is completed, in step S15, the control unit 11 starts transfer of the time waveform data stored in the memory 16 to the storage device 17.

After transfer of the time waveform data is finished, in step S16, the reception unit 14 cancels a trigger hold-off condition. After the trigger hold-off condition is canceled, the reception unit 14 starts sampling in response to reception of the reflected signal from the ground surface. In the example of FIG. 3, after the trigger hold-off condition is canceled, sampling is started at time point t2.

Figure 4:
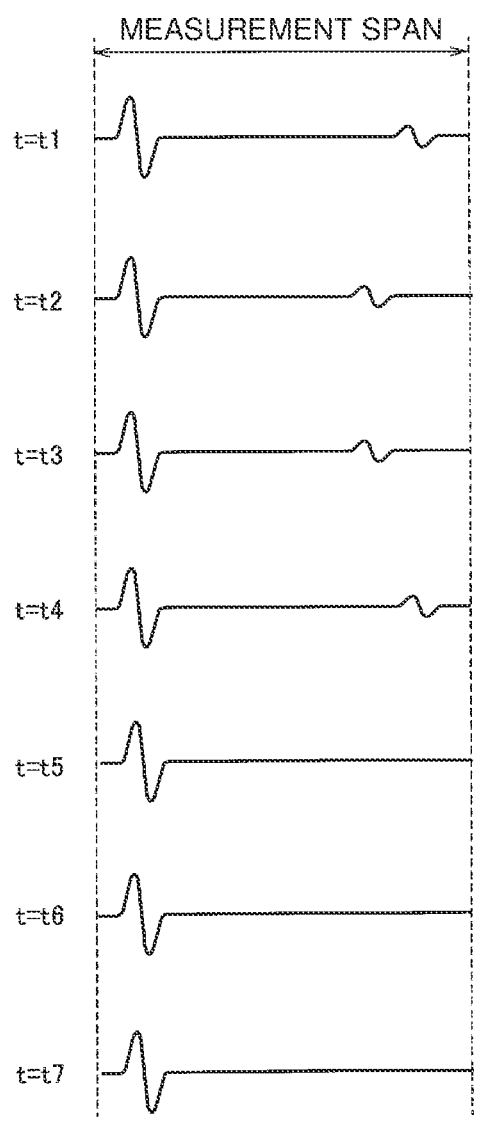
FIG. 4 is a diagram illustrating association between measurement time points and time waveform data.
Figure 5:
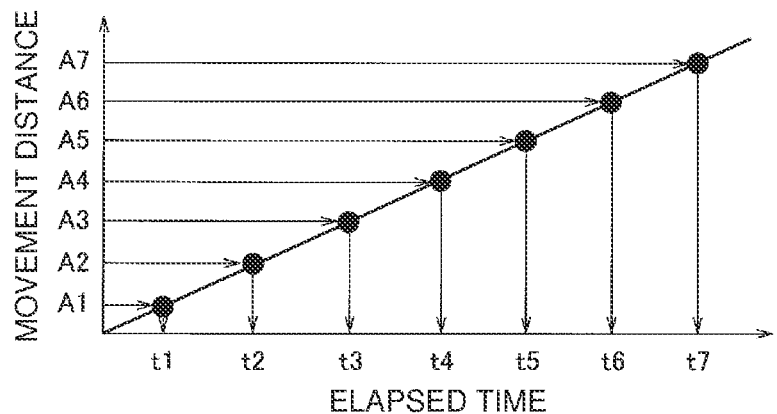
FIG. 5 is a diagram illustrating association between movement distances of the underground investigation device and elapsed times.
Figure 6:
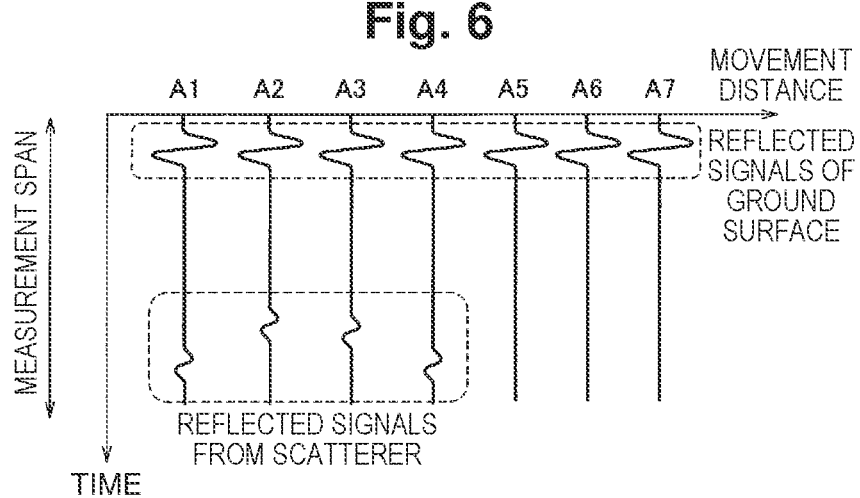
FIG. 6 is a diagram illustrating association between the movement distances of the underground investigation device and the time waveform data.

Next, a process of the signal processing unit 18 will be described with reference to FIG. 4 to FIG. 6.

The reception unit 14 acquires the time waveform data on the basis of time. In other words, as illustrated in FIG. 4, the time waveform data are stored in the storage device 17 while being associated with the measurement time point. In the example of FIG. 4, the time waveform data from time point t1 to time point t7 are saved.

The control unit 11 saves association between the counter value and the elapsed time in the storage device 17. FIG. 5 illustrates association between movement distances A1 to A7 (obtained from the counter values) and time points t1 to t7. In FIG. 5, a horizontal axis is set as the elapsed time, and a vertical axis is set as the movement distance. When movement of the underground investigation device 1 is uniform motion, the graph exhibits a straight line. As a movement speed of the underground investigation device 1 becomes faster, the slope of the graph becomes steeper.

Figure 7:
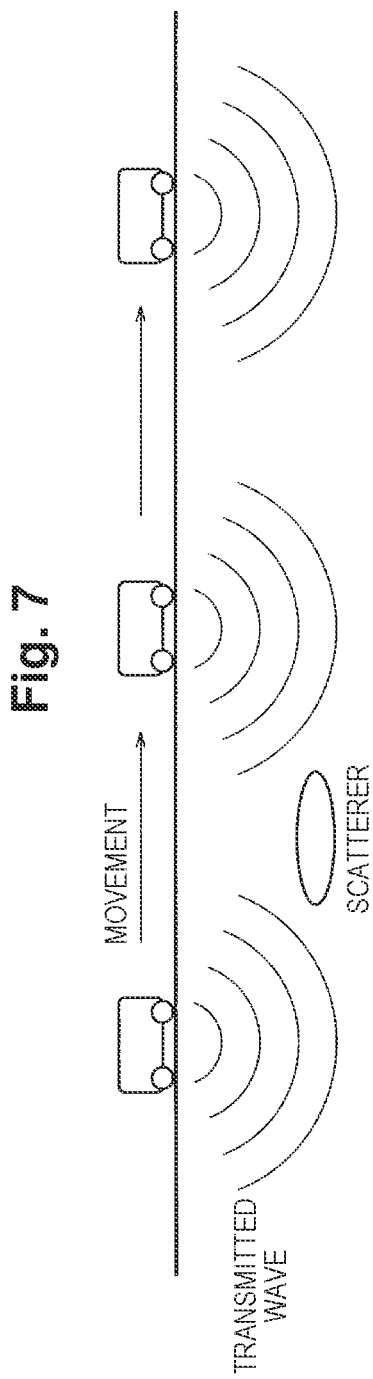
FIG. 7 is a diagram illustrating a state where the underground investigation device performs measurement while moving.

The signal processing unit 18 specifies time points t1 to t7 respectively at the movement distances A1 to A7 and acquires sets of time waveform data which are respectively observed at the specified time points t1 to t7 from the storage device 17. The acquired sets of time waveform data respectively correspond to the reflected signals observed at the movement distances A1 to A7. As illustrated in FIG. 6, the signal processing unit 18 displays information based on the sets of time waveform data side by side while associating the sets of time waveform data with the movement distances. In FIG. 6, the movement distance is set in a lateral direction, and the sets of time waveform data which correspond to the positions are displayed in a vertical direction. From the display in FIG. 6, the states of cross sections of the underground area in the positions through which the underground investigation device has moved can be known. For example, from the display in FIG. 6, as illustrated in FIG. 7, it may be understood that a scatterer is present in the underground area in a position through which the underground investigation device 1 has moved.

Next, setting of the trigger hold-off period and change in the repetition cycle in accordance with the movement speed will be described.

Because the reception unit 14 does not set a new measurement span in the trigger hold-off period, the length of the trigger hold-off period is adjusted, and a start timing of sampling (an interval for observing the reflected signal) can thereby be adjusted. For example, the control unit 11 estimates the movement speed of the underground investigation device 1 from a change amount of the counter value, and when the movement speed of the underground investigation device 1 is slow, the trigger hold-off period is set long. When the movement speed of the underground investigation device 1 is fast, the trigger hold-off period is set short.

Further, the repetition cycle T for transmitting the pulse wave may be changed in accordance with the movement speed of the underground investigation device 1. Because the reflected signal is not sampled in the trigger hold-off period, the pulse wave transmitted in the trigger hold-off period is wasted. Accordingly, the transmission unit 12 may be caused not to transmit the pulse wave in the trigger hold-off period. For example, the repetition cycle T is changed in accordance with the trigger hold-off period.

The control unit 11 adjusts the trigger hold-off period and the repetition cycle T in accordance with the movement speed and can thereby reduce energy consumption for transmission of the pulse wave.

Next, the high sensitivity mode in which high-sensitivity measurement results are obtained by using time waveform data in a plurality of cycles will be described.

In a case where the movement speed of the underground investigation device 1 is a low speed, a movement time for a distance pitch (measurement interval) becomes sufficiently long compared to the repetition cycle T. Thus, a time in which the underground investigation device 1 stays at each measurement position becomes relatively long. In other words, a time assigned to measurement can be set long in each of the measurement positions.

Figure 8:
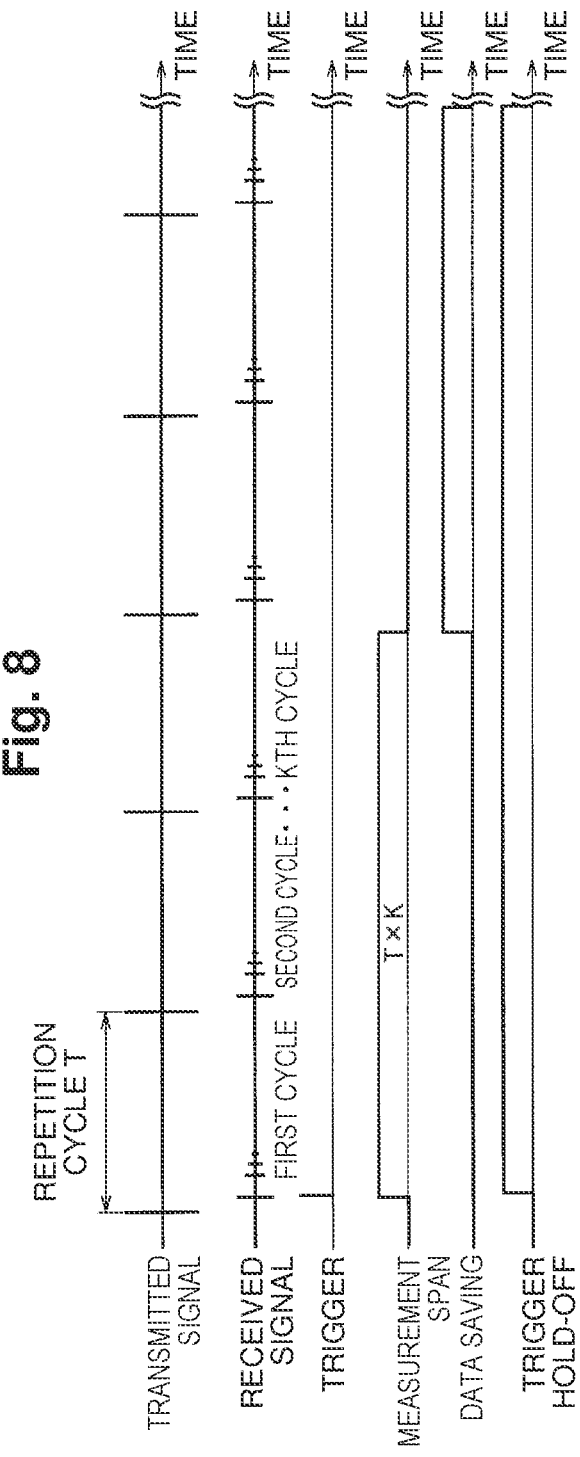
FIG. 8 is a timing chart in a high sensitivity mode.

Accordingly, as illustrated in FIG. 8, for one measurement (from a start of sampling to a finish of saving of the time waveform data), the underground investigation device 1 sets a span K times the repetition cycle T (T×K) as the measurement span. This measurement span includes reflected signals in K cycles. The underground investigation device 1 divides the time waveform data obtained in the measurement span into K parts and generates K sets of time waveform data. The underground investigation device 1 performs an arithmetic mean process for the K sets of time waveform data. Accordingly, a signal-to-noise ratio (SNR) can be improved K times better.

In this high sensitivity mode also, a period from a start of sampling after the trigger to completion of saving of the time waveform data in the storage device 17 is set as the trigger hold-off period. In other words, even when the reception unit 14 receives the reflected signal in the second and subsequent cycles, the trigger is not produced. The reception unit 14 continues sampling from the reflected signal in the first cycle and during the measurement span of T×K. In a case where the number of cycles K to be acquired is large, the size of the time waveform data in K cycles becomes large, the time waveform data being sampled and stored in the memory 16 by the reception unit 14. Thus, a data saving time for transferring the time waveform data from the memory 16 to the storage device 17 also becomes long. The signal processing unit 18 divides the time waveform data transferred to the storage device 17 into K parts, performs the arithmetic mean process, and obtains the time waveform data in the measurement span.

Next, an underground investigation device 1 of a modification example will be described with reference to a flowchart of FIG. 9 and a timing chart of FIG. 10. In the underground investigation device 1 of the modification example, the repetition cycle T is caused to agree with the transfer time of the time waveform data.

Figure 9:
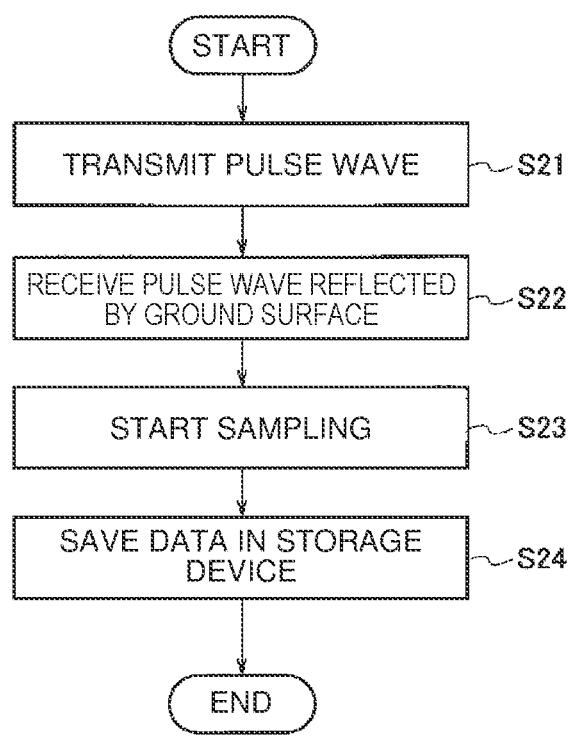
FIG. 9 is a flowchart illustrating a flow of a process of an underground investigation device of a modification example.
Figure 10:
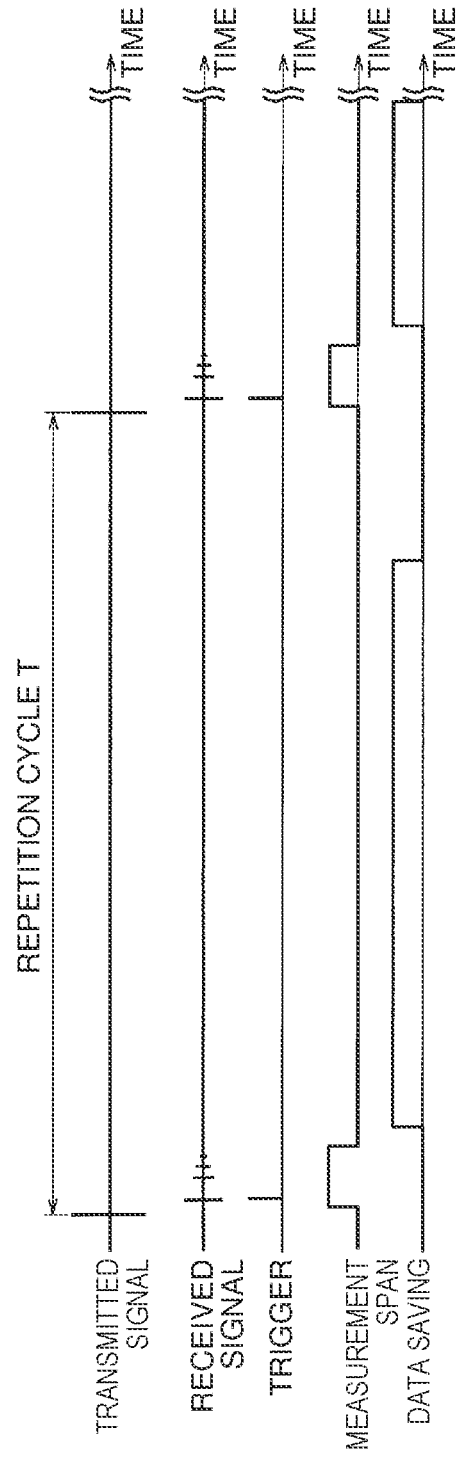
FIG. 10 is a timing chart in measurement of reflected signals by the underground investigation device of the modification example.

When the control unit 11 transmits the sign of the measurement start to the transmission unit 12 and the reception unit 14, the underground investigation device 1 starts a process of FIG. 9.

In step S21, the transmission unit 12 transmits the pulse wave from the transmission antenna 13 to the ground. As illustrated in FIG. 10, the transmission unit 12 sets the length of the repetition cycle T so as not to transmit the next pulse wave (transmitted signal) until saving of the time waveform data is completed.

In step S22, the reception unit 14 receives the reflected signal from the ground surface. The reception unit 14 uses reception of the reflected signal from the ground surface as the trigger of a start of sampling.

In step S23, the reception unit 14 starts sampling of the reflected signal.

When sampling is completed, in step S24, the control unit 11 starts transfer of the time waveform data stored in the memory 16 to the storage device 17.

After completion of transfer of the time waveform data, the next pulse wave is transmitted. Because the next pulse wave is not transmitted until completion of transfer of the time waveform data, the reception unit 14 does not start sampling, and the time waveform data which are being transferred are not overwritten.

Second Embodiment

An underground investigation device of a second embodiment will be described. Similarly to the underground investigation device 1 illustrated in FIG. 1, the underground investigation device of the second embodiment includes the control unit 11, the transmission unit 12, the transmission antenna 13, the reception unit 14, the reception antenna 15, the memory 16, the storage device 17, the signal processing unit 18, the display unit 19, the counter 20, and the wheels 21. Descriptions will not be made about the same points as the first embodiment.

An underground investigation device 1 of the second embodiment defines a timing to save the time waveform data based on the movement distance of the underground investigation device 1.

The control unit 11 obtains the movement distance of the underground investigation device 1 from the counter value. In a case where the underground investigation device 1 moves a predetermined distance, the control unit 11 starts transfer of the newest time waveform data stored in the memory 16 to the storage device 17. During transfer of the time waveform data, the reception unit 14 is set to the trigger hold-off condition so that the time waveform data are not overwritten.

The transmission unit 12 generates the pulse wave in a regular repetition cycle T and radiates the pulse wave from the transmission antenna 13 to the ground surface.

The reception unit 14 samples a reflected signal received by the reception antenna 15 and stores the time waveform data in the memory 16. The time waveform data stored in the memory 16 are transferred to the storage device 17 at each time when the underground investigation device 1 moves a predetermined distance.

The storage device 17 manages the time waveform data on the basis of the movement distance. Specifically, the storage device 17 stores the time waveform data and position information of the time waveform data. The position information of the time waveform data can be obtained from the counter value at a time when the transfer of the time waveform data is started, for example.

Next, operation of the underground investigation device 1 of the present embodiment will be described with reference to a flowchart of FIG. 11.

Figure 11:
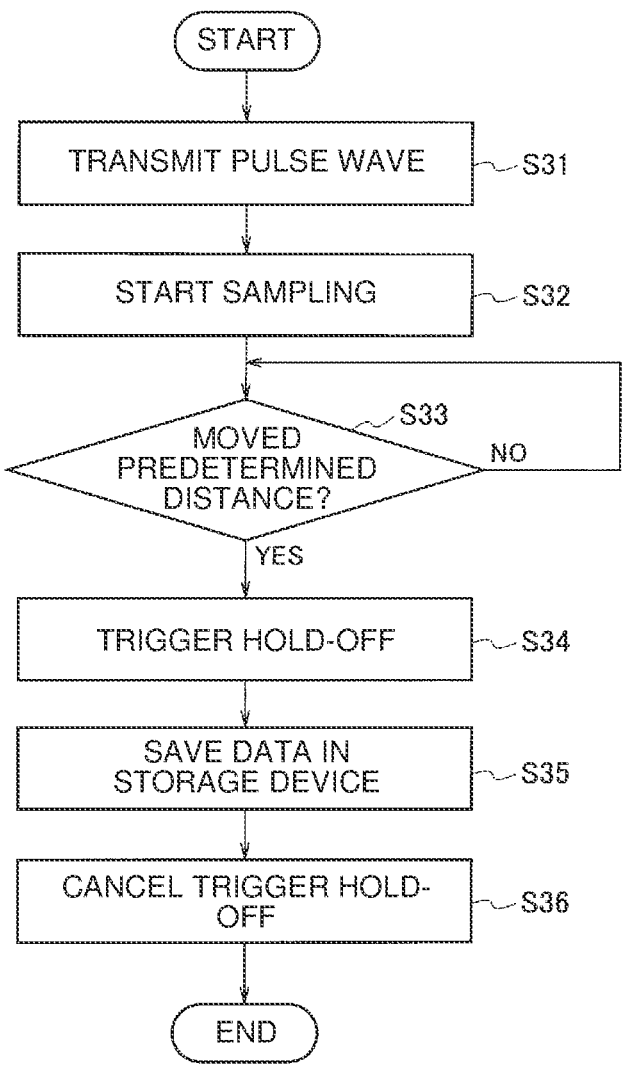
FIG. 11 is a flowchart illustrating a flow of a process of an underground investigation device of a second embodiment.

When the control unit 11 transmits the sign of the measurement start to the transmission unit 12 and the reception unit 14, the underground investigation device 1 starts a process of FIG. 11.

In step S31, the transmission unit 12 transmits the pulse wave from the transmission antenna 13 to the ground. The transmission unit 12 continues to repeatedly transmit the pulse wave.

By using reception of the reflected signal from the ground surface as a trigger, in step S32, the reception unit 14 starts sampling of the reflected signal. The reception unit 14 stores the sampled time waveform data in the memory 16.

Processes of step S31 and step S32 are repeatedly performed until the control unit 11 transmits the sign of the measurement end.

In step S33, the control unit 11 assesses whether or not the underground investigation device 1 has moved a predetermined distance. For example, in a case where the counter value has increased by the amount corresponding to the predetermined distance, the control unit 11 assesses that the underground investigation device 1 has moved the predetermined distance.

When the underground investigation device 1 has moved the predetermined distance, the control unit 11 transfers the time waveform data stored in the memory 16 to the storage device 17.

In step S34, the reception unit 14 starts the trigger hold-off period so that the time waveform data in the memory 16 are not overwritten.

In step S35, the control unit 11 starts transfer of the time waveform data stored in the memory 16 to the storage device 17.

After transfer of the time waveform data is finished, in step S36, the reception unit 14 cancels the trigger hold-off condition.

Figure 12:
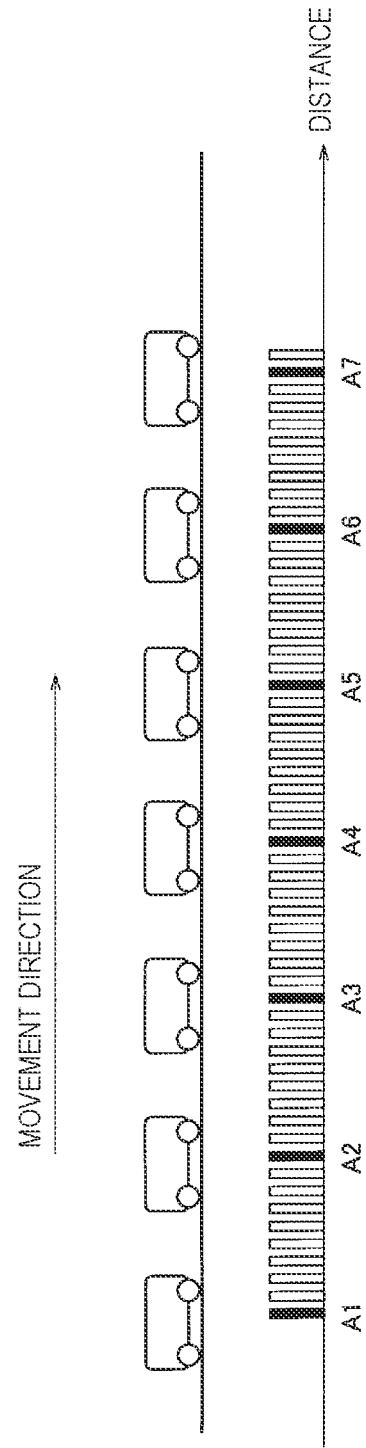
FIG. 12 is a diagram illustrating timings when counter triggers are produced.

At each time when the underground investigation device 1 moves the predetermined distance, processes of step S33 to step S36 are repeated. In the example of FIG. 12, it is indicated that a transfer process of the time waveform data is triggered at spots indicated by A1 to A7.

Figure 13:
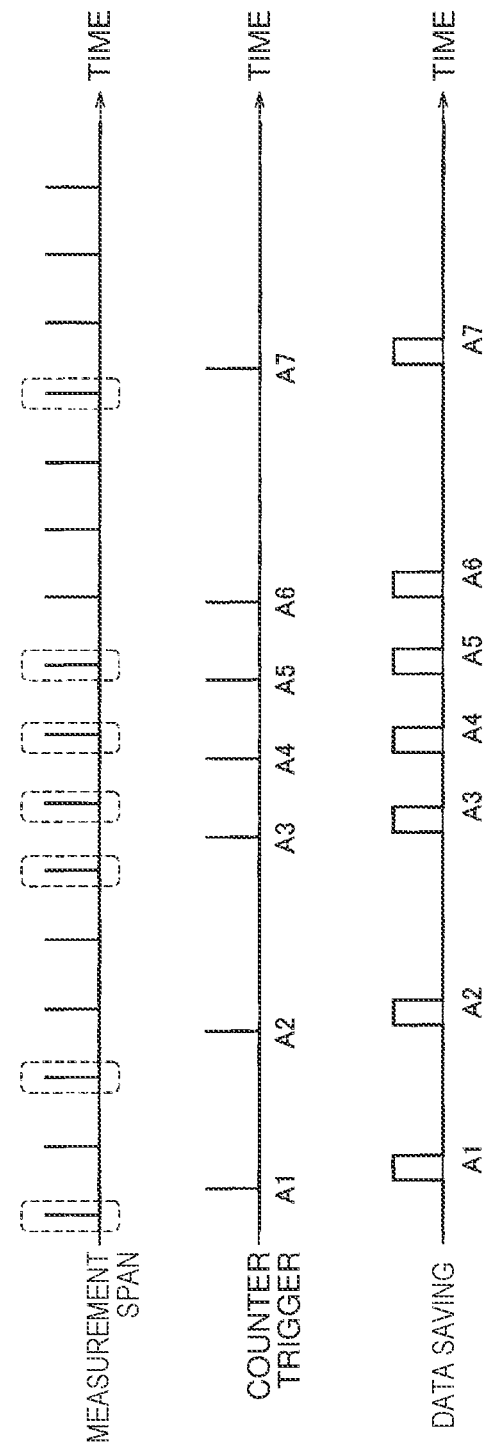
FIG. 13 is a timing chart illustrating data saving timings of the underground investigation device of the second embodiment.

In a timing chart of FIG. 13, measurement spans, counter triggers, and data saving timings are indicated.

The measurement span is a span in which the reception unit 14 samples the reflected signal in step S32. In the second embodiment, regardless of whether or not the sampled time waveform data are saved in the storage device 17, the reception unit 14 samples the reflected signal and stores that in the memory 16.

The counter trigger denotes a timing when, in step S33, the control unit 11 assesses that the underground investigation device 1 has moved the predetermined distance. While the underground investigation device 1 is moving at a uniform speed, the counter triggers are produced at equivalent intervals. As the underground investigation device 1 moves faster, the interval of the counter trigger becomes shorter. In the example of FIG. 13, because the interval between A1 and A2 is longer than the interval between A3 and A4, the speed at which the underground investigation device 1 moves from A1 to A2 is slower than the speed of movement from A3 to A4.

At the counter trigger, the time waveform data stored in the memory 16 are transferred to the storage device 17. In the example of FIG. 13, the sets of time waveform data sampled in the measurement spans are saved in the storage device 17, the measurement spans being placed immediately before the counter triggers and surrounded by broken lines. The sets of time waveform data sampled in the measurement spans not surrounded by the broken lines are not saved in the storage device 17 but are discarded.

Third Embodiment

A configuration of an underground investigation device of a third embodiment will be described with reference to FIG. 14.

An underground investigation device 1 of the third embodiment is enabled to planarly investigate an underground area, by widths of array antennas, by configuring a transmission antenna and a reception antenna with array antennas.

An underground investigation device 1 of the third embodiment includes similar functions to the first embodiment.

Figure 14:
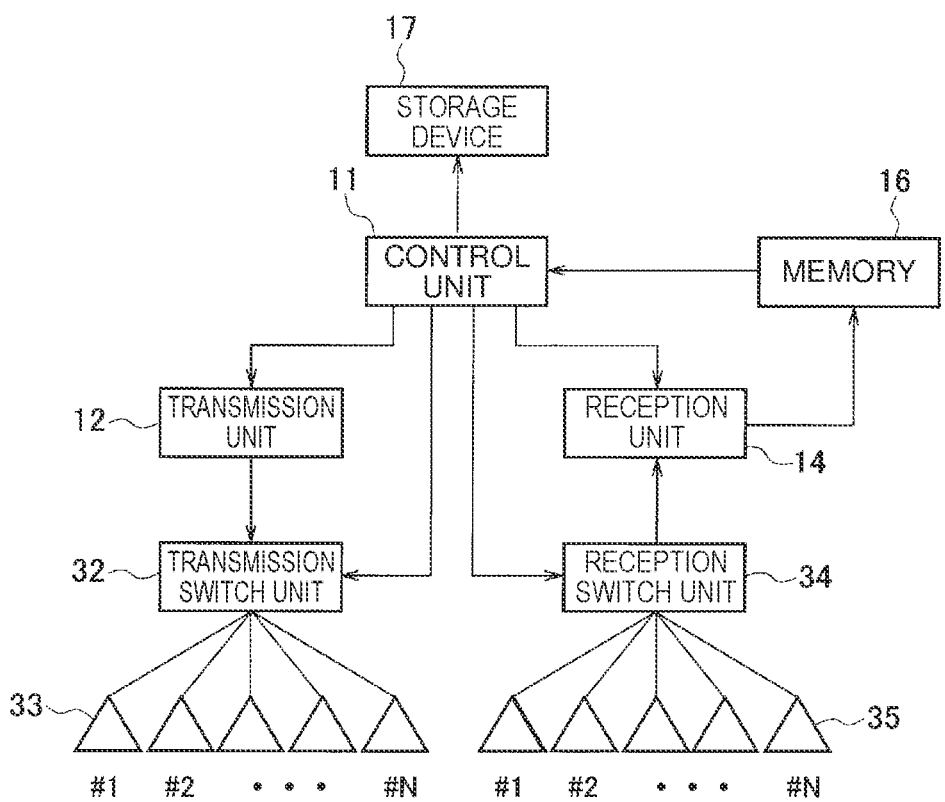
FIG. 14 is a function block diagram illustrating a portion of a configuration of an underground investigation device of a third embodiment.

In addition to the configuration of the underground investigation device 1 of the first embodiment 1, the underground investigation device 1 illustrated in FIG. 14 includes a transmission switch unit 32, a transmission array antenna 33, a reception switch unit 34, and a reception array antenna 35. Each of the transmission array antenna 33 and the reception array antenna 35 is an array antenna in which N antenna elements are aligned in one line, perpendicularly to a traveling direction. Note that FIG. 14 does not illustrate the signal processing unit 18, the display unit 19, the counter 20, or wheels 21.

The control unit 11 transmits a switch signal to the transmission switch unit 32 and the reception switch unit 34. As illustrated in a timing chart of FIG. 15, the switch signal has the same cycle as the repetition cycle T.

The transmission unit 12 generates the pulse wave in a regular repetition cycle T and transmits the pulse wave from the selected antenna element to the ground surface via the transmission switch unit 32. As illustrated in FIG. 15, the transmission unit 12 may transmit the pulse wave after the antenna elements are switched.

The transmission switch unit 32 switches the antenna elements to transmit the pulse wave based on the switch signal. Specifically, as illustrated in FIG. 15, the transmission switch unit 32 in order switches the antenna elements to transmit the pulse wave from a first antenna element to an Nth antenna element. The Nth antenna element is next switched to the first antenna element by the transmission switch unit 32.

The reception switch unit 34 switches the antenna elements to receive the reflected wave based on the switch signal. The transmission switch unit 32 and the reception switch unit 34 synchronously switch the antenna elements. In other words, the reflected signal of the pulse wave transmitted from an nth antenna element of the transmission array antenna 33 is received by an nth antenna element of the reception array antenna 35.

The reception unit 14 samples the reflected signal received by the selected antenna element via the reception switch unit 34 and stores the reflected signal in the memory 16. Because the reception switch unit 34 switches the antenna elements, the reception unit 14 successively samples the reflected signals received by a first antenna element to an Nth antenna element. In other words, the length of the measurement span becomes a length of cycle T×a number N of antenna elements. The reception unit 14 successively samples the reflected signals received by the first antenna element to the Nth antenna element, and thereby time lags among sets of data obtained by the antenna elements become very short. As illustrated in FIG. 15, the reception unit 14 may start the measurement span in response to the switch signal for the first antenna element.

As illustrated in FIG. 15, in order not to trigger sampling when the reflected signal from the ground surface is received by the second and subsequent antenna elements, the reception unit 14 starts the trigger hold-off period before receiving the reflected signal from the ground surface by the second antenna element.

After the measurement span, the control unit 11 transfers the time waveform data with a length of N samplings, which are stored in the memory 16, to the storage device 17. The trigger hold-off period is set at least until transfer of the time waveform data is completed.

The signal processing unit 18 divides the time waveform data saved in the storage device 17 into N parts, aligns sets of time waveform data resulting from division into N parts based on intervals of the antenna elements, and can thereby obtain the time waveform data in one line along arrangement of the antenna elements. In addition, the underground investigation device 1 can planarly investigate the underground area by sequentially performing measurement in accordance with travel of the underground investigation device 1.

Note that in the third embodiment, the method in the first embodiment may be used which manages the time waveform data on the basis of time, or the method in the second embodiment may be used which manages the time waveform data on the basis of the movement distance.

As described in the foregoing, the underground investigation device 1 of the present embodiment investigates the underground area while moving, the underground investigation device 1 including the transmission unit 12 configured to transmit the pulse wave in the predetermined repetition cycle, the reception unit 14 configured to receive the reflected signal of the pulse wave, the memory 16 configured to store the time waveform data of the reflected signal, the storage device 17 having a larger capacity than a capacity of the memory 16, the control unit 11 configured to transfer the time waveform data from the memory 16 to the storage device 17, and the signal processing unit 18 configured to generate the underground investigation data based on the time waveform data stored in the storage device 17. The reception unit 14 sets the measurement span for sampling the reflected signal by using, as the trigger, transmission of the pulse wave or reception of the reflected signal resulting from reflection of the pulse wave by the ground surface, samples the reflected signal in the measurement span, and stores the time waveform data in the memory 16. The control unit 11 transfers the time waveform data from the memory 16 to the storage device 17 after the measurement span. The reception unit 14 provides the trigger hold-off period in which a new measurement span is not set at least until transfer of the time waveform data is completed. The underground investigation device 1 limits sampling of the reflected signal by the real-time sampling procedure to the measurement span, can thereby acquire data at a higher speed than that of a device employing an equivalent time sampling procedure, and can inhibit data generation in an unnecessary span.

The underground investigation device 1 of the present embodiment transfers the time waveform data from the memory 16 to the storage device 17 having a larger capacity and provides the trigger hold-off period in which the measurement span is not set until transfer of the time waveform data is completed, and it thereby becomes possible to make small the capacity of the memory 16 capable of high speed access and to perform measurement for a long distance.

The underground investigation device 1 of the present embodiment changes the trigger hold-off period and the predetermined repetition cycle in accordance with the movement speed, can thereby inhibit unneeded sending of signal, and can intend noise reduction and a decrease in an energy consumption amount.

The underground investigation device 1 of the present embodiment sets the measurement span to K times the repetition cycle T, samples the reflected signals through a plurality of cycles, divides the time waveform data sampled through the plurality of cycles into K parts by the length of the repetition cycle T, obtains the arithmetic mean of K sets of time waveform data, and can thereby improve the signal-to-noise ratio.

The underground investigation device 1 of the present embodiment includes the transmission array antenna 33 and the reception array antenna 35 which are configured with a plurality of antenna elements. The reception unit 14 sets the measurement span such that the measurement span corresponds to the period in which switching among all of the antenna elements is performed and successively samples the reflected signals received by all of the antenna elements in the measurement span, and the underground investigation device 1 can thereby handle multi-channel measurement.

REFERENCE SIGNS LIST

1 Underground investigation device
11 Control unit
12 Transmission unit
13 Transmission antenna
14 Reception unit
15 Reception antenna
16 Memory
17 Storage device
18 Signal processing unit
19 Display unit
20 Counter
21 Wheel
32 Transmission switch unit
33 Transmission array antenna
34 Reception switch unit
35 Reception array antenna

The invention claimed is:
1. An underground investigation device that investigates an underground area while moving, the underground investigation device comprising:
a transmission unit configured to transmit a pulse wave in a predetermined repetition cycle;
a reception unit configured to receive a reflected signal of the pulse wave;

a memory configured to store time waveform data of the reflected signal;

storage means having a larger capacity than a capacity of the memory;

a control unit configured to transfer the time waveform data from the memory to the storage means; and a signal processing unit configured to generate underground investigation data based on the time waveform data stored in the storage means, wherein the reception unit sets a measurement span for sampling the reflected signal by using, as a trigger, transmission of the pulse wave or reception of a reflected signal resulting from reflection of the pulse wave by a ground surface, samples the reflected signal in the measurement span, and stores time waveform data in the memory, the control unit transfers the time waveform data from the memory to the storage means after the measurement span, and the reception unit provides a trigger hold-off period in which the new measurement span is not set at least until transfer of the time waveform data is completed.

2. The underground investigation device according to claim 1, wherein a measurement time point of the time waveform data is added to the time waveform data, the control unit stores a movement distance of the underground investigation device and an elapsed time in the storage means while associating the movement distance with the elapsed time, and the signal processing unit generates underground investigation data in which the time waveform data are associated with the movement distance based on the measurement time point of the time waveform data, the movement distance, and the elapsed time.

3. The underground investigation device according to claim 2, wherein the trigger hold-off period and the predetermined repetition cycle are changed in accordance with a movement speed of the underground investigation device.

4. The underground investigation device according to claim 2, wherein the reception unit sets a length of the measurement span to a plurality of times the repetition cycle and samples the reflected signal through a plurality of cycles, and the signal processing unit divides time waveform data sampled in the measurement span by the length of the repetition cycle and obtains an arithmetic mean of the time waveform data resulting from division.

5. The underground investigation device according to claim 2, wherein the transmission unit includes a transmission antenna array configured with a plurality of antenna elements and switches antenna elements to transmit a pulse wave while being synchronized with the repetition cycle, the reception unit includes a reception antenna array configured with a plurality of antenna elements and switches antenna elements to receive a reflected signal while being synchronized with the repetition cycle, the reception unit sets a length of the measurement span to a length in which all of the plurality of antenna elements of the reception antenna array receive reflected signals and samples the reflected signals through all of the plurality of antenna elements, and the signal processing unit divides time waveform data sampled in the measurement span for each of the plurality of antenna elements and aligns the time waveform data resulting from division based on arrangement of the plurality of antenna elements.

6. The underground investigation device according to claim 1, wherein the control unit transfers the time waveform data by using, as a trigger, movement of the underground investigation device by a predetermined distance and adds a movement distance of the underground investigation device to the time waveform data, and the signal processing unit generates underground investigation data based on the time waveform data and the movement distance added to the time waveform data.

7. The underground investigation device according to claim 6, wherein the trigger hold-off period and the predetermined repetition cycle are changed in accordance with a movement speed of the underground investigation device.

8. The underground investigation device according to claim 6, wherein the reception unit sets a length of the measurement span to a plurality of times the repetition cycle and samples the reflected signal through a plurality of cycles, and the signal processing unit divides time waveform data sampled in the measurement span by the length of the repetition cycle and obtains an arithmetic mean of the time waveform data resulting from division.

9. The underground investigation device according to claim 6, wherein the transmission unit includes a transmission antenna array configured with a plurality of antenna elements and switches antenna elements to transmit a pulse wave while being synchronized with the repetition cycle, the reception unit includes a reception antenna array configured with a plurality of antenna elements and switches antenna elements to receive a reflected signal while being synchronized with the repetition cycle, the reception unit sets a length of the measurement span to a length in which all of the plurality of antenna elements of the reception antenna array receive reflected signals and samples the reflected signals through all of the plurality of antenna elements, and the signal processing unit divides time waveform data sampled in the measurement span for each of the plurality of antenna elements and aligns the time waveform data resulting from division based on arrangement of the plurality of antenna elements.

10. The underground investigation device according to claim 1, wherein the trigger hold-off period and the predetermined repetition cycle are changed in accordance with a movement speed of the underground investigation device.

11. The underground investigation device according to claim 10, wherein the reception unit sets a length of the measurement span to a plurality of times the repetition cycle and samples the reflected signal through a plurality of cycles, and the signal processing unit divides time waveform data sampled in the measurement span by the length of the repetition cycle and obtains an arithmetic mean of the time waveform data resulting from division.

12. The underground investigation device according to claim 10, wherein the transmission unit includes a transmission antenna array configured with a plurality of antenna elements and switches antenna elements to transmit a pulse wave while being synchronized with the repetition cycle, the reception unit includes a reception antenna array configured with a plurality of antenna elements and switches antenna elements to receive a reflected signal while being synchronized with the repetition cycle, the reception unit sets a length of the measurement span to a length in which all of the plurality of antenna elements of the reception antenna array receive reflected signals and samples the reflected signals through all of the plurality of antenna elements, and the signal processing unit divides time waveform data sampled in the measurement span for each of the plurality of antenna elements and aligns the time waveform data resulting from division based on arrangement of the plurality of antenna elements.

13. The underground investigation device according to claim 1, wherein the reception unit sets a length of the measurement span to a plurality of times the repetition cycle and samples the reflected signal through a plurality of cycles, and the signal processing unit divides time waveform data sampled in the measurement span by the length of the repetition cycle and obtains an arithmetic mean of the time waveform data resulting from division.

14. The underground investigation device according to claim 13, wherein the transmission unit includes a transmission antenna array configured with a plurality of antenna elements and switches antenna elements to transmit a pulse wave while being synchronized with the repetition cycle, the reception unit includes a reception antenna array configured with a plurality of antenna elements and switches antenna elements to receive a reflected signal while being synchronized with the repetition cycle, the reception unit sets a length of the measurement span to a length in which all of the plurality of antenna elements of the reception antenna array receive reflected signals and samples the reflected signals through all of the plurality of antenna elements, and the signal processing unit divides time waveform data sampled in the measurement span for each of the plurality of antenna elements and aligns the time waveform data resulting from division based on arrangement of the plurality of antenna elements.

15. The underground investigation device according to claim 1, wherein the transmission unit includes a transmission antenna array configured with a plurality of antenna elements and switches antenna elements to transmit a pulse wave while being synchronized with the repetition cycle, the reception unit includes a reception antenna array configured with a plurality of antenna elements and switches antenna elements to receive a reflected signal while being synchronized with the repetition cycle, the reception unit sets a length of the measurement span to a length in which all of the plurality of antenna elements of the reception antenna array receive reflected signals and samples the reflected signals through all of the plurality of antenna elements, and the signal processing unit divides time waveform data sampled in the measurement span for each of the plurality of antenna elements and aligns the time waveform data resulting from division based on arrangement of the plurality of antenna elements.

* * * * *